United States Patent [19]

le Henand

[11] Patent Number: 4,513,244

[45] Date of Patent: Apr. 23, 1985

[54] MEASURING AND RECORDING APPARATUS

[76] Inventor: Claude le Henand, 15bis, rue des Meuniers, 45300 Pithiviers, France

[21] Appl. No.: 264,846

[22] Filed: May 18, 1981

[51] Int. Cl.³ .......................... G01D 9/00; G01D 15/16
[52] U.S. Cl. ..................................... 324/51; 346/33 R
[58] Field of Search ..................... 324/51, 113, 158 R; 374/186; 346/49, 33 A, 33 R, 33 C, 33 TP

[56] References Cited

U.S. PATENT DOCUMENTS

| 3,436,732 | 4/1969 | Charters | 346/33 R X |
| 3,950,759 | 4/1976 | Ziegenfuss | 346/33 R |
| 4,318,276 | 3/1982 | Sato | 346/33 TP X |

FOREIGN PATENT DOCUMENTS 204065 6/1956 Australia .............. 346/33 R

Primary Examiner—Stanley T. Krawczewicz
Assistant Examiner—Jose M. Solis
Attorney, Agent, or Firm—Larson and Taylor

[57] ABSTRACT

A measuring and recording apparatus for testing the operation of a home electrical appliance and the like comprises a multiscale electrical current recorder associated with a current probe for connection to a circuit in which the current value is to be monitored. A digital temperature meter associated with a digital display has memory means operable to store the temperature level responsive to a predetermined event, i.e. a maximum value of the temperature, and with an outside temperature probe. Electronic circuit means render the recorder operative to record the current value only responsive to detection of a current above a predetermined level by said current probe.

5 Claims, 2 Drawing Figures

MEASURING AND RECORDING APPARATUS

BACKGROUND AND SUMMARY OF THE INVENTION

The invention relates to measuring and recording apparatus particularly for use in testing and maintaining electrical domestic appliances operating at a temperature different from the ambient temperature, typically refrigerators and washing machines.

There exist numerous types of measuring apparatus which generally comprises individual units, such as current meters, voltmeters, counters, wattmeters and thermometers. Continuous monitoring by a technician is required during use. Substituting optically readable instruments with recording instruments, for instance of the type disclosed in "Technische Rundschau" Vol. 66, No. 33, pp. 19-20, cannot be regarded as a definite improvement, since later reading of a recorded strip corresponding to the whole duration of an operating cycle is a time consuming operation, particularly when the operating cycle is rather long.

It is an object of the invention to provide an improved measuring and recording apparatus suitable for shop test maintenance and/or repair of electrical domestic appliances operating in accordance with a predetermined cycle.

It is a more specific object to provide an apparatus which is of relatively low cost and versatile in use and which makes it possible to spare working hours by removing the need for continuous attendance during tests and visual inspection of a recorded strip corresponding to the whole time duration of the cycle.

Still another object of the invention is to render the apparatus operable to provide a record of the variations of the relevant parameter(s) during an operating cycle of a domestic electric appliance operating at a temperature which is different from the ambient temperature without attendance, while visual monitoring remains possible and recording occurs only during predetermined portions of the cycle.

It is a secondary object to render the apparatus adaptable to fairly different types of domestic appliances, and particularly to those machines which operate at a temperature in excess of the ambient temperature (electric ovens, electrical cloth and dish washing machines) and those for lowering the temperature within an enclosure (refrigerators, and deep freeze machines).

According to the invention, there is provided an apparatus having an housing locating a multiscale electrical current recorder and a digital thermometer, as well as an electronic circuit. The recorder is associated with a current probe for connection to a circuit to be monitored (i.e. the power circuit of the machine to be tested) and to a temperature probe. Memory means are operable to store the temperature level responsive to a predetermined event (for instance the maximum value of the temperature). The electronic circuit is designed for rendering the recorder operative to record the electrical current in the circuit to be monitored when that current exceeds a predetermined value.

The invention will be better understood from the following description of a particular embodiment, given by way of example only. The description refers to the accompanying drawings.

SHORT DESCRIPTION OF THE DRAWINGS

DETAILED DESCRIPTION OF A PARTICULAR EMBODIMENT

The apparatus which will now be described by way of example is arranged for testing either "cold" machines, i.e. refrigerators and freezers, or "hot" machines, in which heat is produced by an electric current (electric ovens and particularly washing machines).

The operating cycles of such machines differ from each other and the relevant parameters are not the same. It has been found by Inventor that the data to be made available may be summarized as follows.

Cold machines: The parameters to be continuously recorded are the value of the electric current and the temperature within a range which is typically from $-40°$ C. to $+10°$ C., preferably with the recorder operating at a relatively low speed; simultaneously, the temperature should be displayed for rendering it possible for an operator to determine the condition of the machine under test at a glance.

Hot machines: A washing machine has a power consumption which changes by an order of magnitude when heating electric current is initiated or cut off. To avoid useless operation of the recorder, which would result in unnecessary length of paper strip being unwinded, the current I should be recorded as long as it is higher than a predetermined threshold and it is important that such record is retained for a short period thereafter, typically about five minutes. Selection of the appropriate scale between two scales at least should be provided for the record to be readily readable. High speed unwinding of the recording medium, typically a paper strip, should be provided. Temperature recording will generally be useless, but it is essential to have a visual display of the maximum temperature which was attained during an operating cycle.

Again, the apparatus may preferably be designed for an attendant operator to have the possibility to read the instantaneous value of the current taken by the tested machine at a glance.

Figure 1:
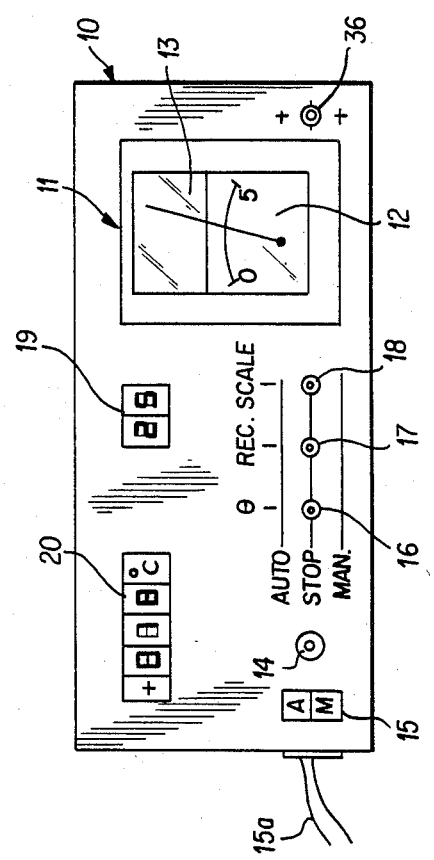
FIG. 1 is a schematic view of the front panel of the housing of an apparatus according to a particular embodiment.

Referring now to FIG. 1, there is shown the front panel of a common housing locating the electronics of the apparatus. The front panel carries:

a current measuring and recording unit 11, of the inkless type, having a movable needle whose displacement along a readable scale 12 is caused by an electrical signal. The recording unit has an electric motor (not shown in FIG. 1) which unwinds a paper strip 13 under the needle. A cam actuated printing bar periodically strikes the needle against the paper strip to provide a dot representing the value of the input signal of the unit. When the printing bar is in released condition, it closes an electrical contact, as will appear in more detail later.

a thermometer provided with a digital display 20 and a connector 14 for a cord terminated with a temperature probe typically adapted to operate between $-110°$ C. and $750°$ C.

a power switch 15 for initiating and stopping operation of the apparatus.

a double manual switch 36 for selection of the rate of unwinding of the paper strip on the recorder.

a bank of selection switches each having three positions (stop, automatic and manual) for selecting a type of operation (or a scale). As illustrated, selection switch 16 is for selecting temperature display or recording, switch 17 is for selecting the type of recording and switch 18 is for scale selection.

last, a display unit 19 indicates the current scale of operation of recording unit 11.

The housing is additionally provided with a cord 15a for connection with a power supply which will typically be A.C. current having a frequency of 50 Hz or 60 Hz. A socket (not shown) is also provided for receiving the plug of the machine to be tested.

Figure 2:
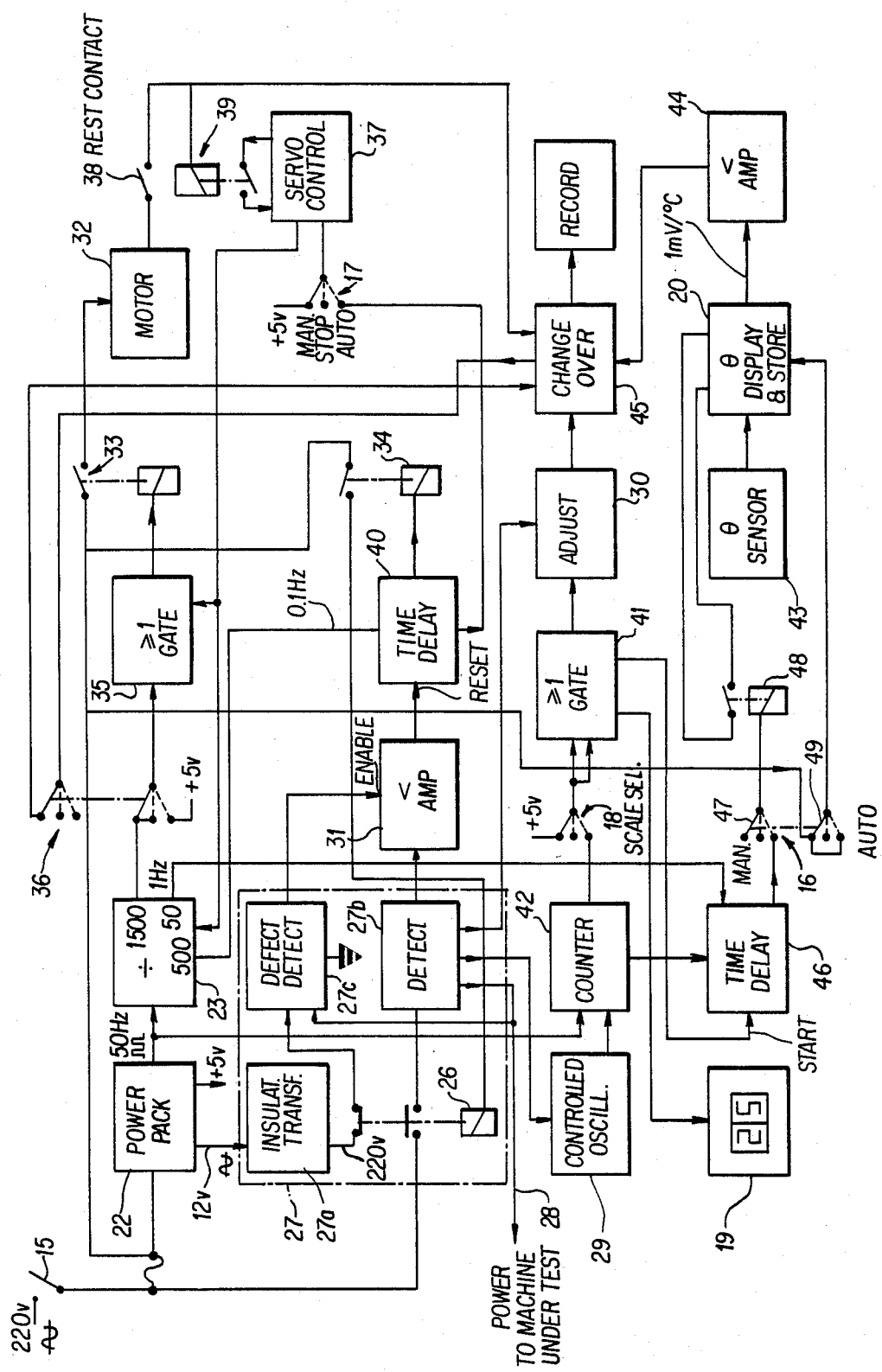
FIG. 2 is a simplified block diagram of the apparatus.

Referring now to FIG. 2, the electrical power input is connected by switch 15 to a power pack 22 which delivers the +5 V voltage necessary for operation of the electronic circuitry and square pulses at the frequency of the mains, i.e. 50 Hz or 60 Hz. Assuming that the frequency is 50 Hz, the square signals are delivered to a divider 23 for dividing the input frequency by 50, 500 and 1500, for purposes to be indicated later.

The power input is also connected to a measuring block 27 constructed to fulfill a plurality of functions. That block may comprise:

an insulating transformer 27a which receives 12 V A.C. current from power pack 22;

a circuit 27b including current detection probe (typically a current transformer) for providing an A.C. signal representative of the electric current taken by the machine to be tested, connected to an output 28 of the block which receives the current through that block;

a detection circuit 27c which is arranged to deliver an output if there is a leak current due to defective insulation higher than a predetermined threshold (typically 5 mA) and an enabling signal is the current taken by the machine under test exceeds a predetermined threshold;

Circuits 27c and 27b are fed with 220 V A.C. current from insulation transformer 27a and switch 15 through respective contacts of a relay 26 whose coil is supplied by means which will be described later.

The A.C. signal from the current transformer is converted by circuit 27b into a low level D.C. signal, representative of the value of the A.C. current, which is delivered to an amplifier 31. That same circuit 27b includes means for delivering a frequency control signal representative of the current taken by the machine under test to a controlled oscillator 29 which is used for scale selection (5 A or 25 A for full deflection) and means which deliver a signal for automatic adjustment of zero and full scale deflection to an adjustment circuit 30.

As indicated above, the motor 32 of the recorder 11 should be actuated for step by step advance of the paper strip as long as the machine under test takes a current which is higher than a predetermined threshold programmed on the detection circuit 27b and the motor should be stopped while the needle is clear from the printing bar for it to indicate the actual value of the current in a visually directly readable form. For that purpose, the movable contact of a relay 33 is located on a power line for energizing recorder motor 32. The winding of relay 33 is connected to the output of an OR gate 35. One of the two inputs of the gate 35 is connected to one of the movable contacts of manual switch 36 having three positions. In two positions (upper two positions in FIG. 2), it connects the OR gate to an output of divider 33 delivering a pulse per 30 seconds for resulting in an advance of the paper strip at a speed of one inch per hour. In the last position, the input of gate 35 is connected to the +5 Volts D.C. supply for continuously enabling the gate. The second input of gate 35 is connected to a circuit 37 for servocontrol of the printing bar. Circuit 37 receives a signal indicating whether the rest contact 38 of the printing bar is open or closed, through a relay 39 whose object is to attenuate the perturbations due to operating noise.

The manual switch 17 is connected to a control input of circuit 37 for connecting it either to the +5 Volts D.C. supply (manual control) or to a contact which does not provide any connection (stop or rest condition) or to a contact connected to the output of a time delay circuit 40 (automatic operation). The time delay circuit is connected to the amplifier 31 and to the 0.1 Hz output of divider 23. It may consist of a counter which delivers an overflow signal after if has received 30 pulses and which is reset to zero each time the amplifier 31 delivers an appropriate control voltage. The overflow signal energizes a relay 34 whose contact controls energization of the winding of relay 26.

The arrangement is such that amplifier 31 is enabled by a control signal which is delivered by circuit 27c when the current taken by the machine under test through line 28 exceeds a predetermined threshold, indicating that the machine under test operates. Motor 32 may be either energized continuously for unwinding at a speed of 15 m/h (in manual condition of switch 36) or energized periodically for the speed to be 1 in/h (when the current exceeds the threshold and for an additional period adjusted by time delay circuit 40, typically 5 mn, thereafter).

Scale selection is controlled by manual switch 18 cooperating with an OR gate 41. In the position where it is illustrated in FIG. 1, switch 18 continuously connects the inputs of the gate to the +5 Volts D.C. supply for 25 A calibration. Then gate 41 delivers to adjustment circuit 30 a logical control voltage causing it to have an amplification coefficient corresponding to full deflection of the needle for a current value equal to 25 A. Simultaneously, gate 41 causes display of number "25" by unit 10 and enables time delay circuit 46, whose purpose will appear later. In its mid-position, switch 18 blocks gate 41, for 5 A calibration to occur and to be displayed by 19. In the third position, designated "auto" in FIG. 1, the calibration is automatically selected depending upon the value of the current taken by the machine under test (usually a "hot" machine). Then the inputs of gate 41 are connected to the output of a counter and comparator 42 whose two inputs respectively receive square pulses at a frequency of 50 Hz from power pack 22 and pulses at a frequency whose relation with the current in line 28 depends on initial adjustment of oscillator 29. A counter 42 typically having a capacity of 5 to 6 positions delivers a signal which causes operation on a 25 amperes or 5 amperes scale depending on whether the current value is higher or lower than a threshold, for instance 8 A, which causes overflow when exceeded.

Other values for full scale deflection of the needle may of course be selected. However, the 5 A and 25 A values are generally of advantage, since change at a predetermined value typically of about 8 A corresponds to operation of the usual "hot" machines and particularly dish washing and cloth washing machines: then, the current taken by the machine is lower than 5 A when there is no heating by an electric resistor, higher than 10 A when there is heating associated with operation of the motor. On the other hand, those machines which use gas heating associated with an electric motor always input a current which is lower than 5 A.

Turning to temperature measurement, the apparatus comprises a temperature sensor 43 which is typically designed for possible operation in a range of from −110° C. to 750° C. That sensor, which may be a thermocouple, is connected by an electric line to a digital thermometer 20 having a memory circuit and a visual display, for instance a 7-segment display. An analog output of the digital thermometer 20 is connected to a linear amplifier 44 whose output is connected to a time division multiplex circuit which constitutes a change over switch 45 which also receives the current representative signal through the circuit leg consisting of current measuring circuit 27 and adjustment circuit 30. The output of change over switch 45 is applied to the recorder 11 for deflecting the needle thereof. Successive changes occur at a predetermined frequency, but only when two terminals of change over switch 45 are connected by a second contact of switch 36 as indicated in FIG. 2.

The apparatus may be operated for displaying the current value of the maximum of the temperature during a cycle. For that purpose, control terminals of the digital thermometer 20 are connected to a relay 48 energized by a contact 47 of selection switch 16 which has three positions. In the "automatic" position, contact 47 of switch 16 connects the input of thermometer 20 to a time delay circuit 46 whose purpose is to avoid recording a maximum temperature which is only transient. The time delay circuit receives pulses at a frequency of 1 Hz from divider 23 and is triggered by gate 41. There is a change in the temperature displayed by digital thermometer 20, i.e. writing in the memory only if there is a temperature increase for a time which is longer than a predetermined value, corresponding for instance to a predetermined number of pulses from divider 23. In the "manual" position of switch 16, relay 48 is de-energized; thermometer 20 however still receives 220 V A.C. power for operation through a second movable contact 49 of switch 16.

As indicated above, circuit 45 is used for alternately recording the temperature and the current value when the switch 36 is in the condition illustrated in FIG. 2, identified "1 in/h and θ". For that purpose, a control input of circuit 45 is connected to the rest contact 38 of the printing bar. Each closure of the contact causes a signal to be applied to selection circuit 45, which changes the signal applied to recorder 11 from temperature display and record to current display and record, and then the reverse. The resultant chart then carries two lines of dots indicating the variations of temperature and current with time.

No detailed description of the operation is necessary since it may easily be understood from the construction and purpose of the apparatus. The latter may be built from currently available electric and electronic commercial components, for instance MOS integrated circuits and relays having contacts in sealed vacuum envelopes As an example, divider 23 and the OR gates may include CD 4017 and CD 4001 circuits. Motor control, including time delay before stop, may be achieved by CD 4001, CD 4017 and CD 4069 circuits, as scale selection.

Thermometer 20 may be of the type commercially available under the reference Pen 96 J from Chauvin-Arnoux of France.

I claim:

1. A measuring and recording apparatus for testing the operation of a home electrical appliance comprising, in a common housing:
   multiscale electrical current displaying and recording means for providing a permanent record on a paper strip having an electrical motor for unwinding said strip,
   a power line for delivery of electrical power to the home electrical appliance to be tested,
   a current probe for measurement of the current in said power line,
   a temperature probe adapted to be located in said home electrical appliance for detection of the temperature thereof,
   digital temperature meter means associated with said temperature probe and provided with memory means operable to store a maximum value of the temperature sensed by said temperature probe,
   electrical circuit means for operating said motor in response to detection of a current above a predetermined level by said current probe,
   and change over means for alternately delivering signals representative of the current sensed by said current probe and of the temperature sensed by said temperature probe to said current recorder, whereby a permanent record of the current and temperature is obtained.

2. Apparatus according to claim 1, comprising additional electronic means operatively associated with said multiscale electrical current displaying and recording means for automatically changing the scale of said displaying and recording means responsive to the value of said electrical current.

3. Apparatus according to claim 1, wherein said electrical current displaying and recording means has two scales, with full deflection of an indicating means of said recording and displaying means having the larger scale corresponding to a current higher than the current in a home washing machine during the non heating periods and lower than the current during the heating periods.

4. Apparatus according to claim 1, having delay means for delaying storing of the maximum value of the temperature in the memory means in place of a former value for a predetermined delay after initial increase of said temperature beyond the stored value.

5. Apparatus according to claim 1, wherein the electrical current displaying and recording means comprises a recorder of the type having a needle movable in relation to a visually readable scale and a printing bar for striking the needle against a movable paper strip for recording, and including a circuit responsive to closure of a rest contact of the printing bar for delaying de-energization of a paper driving motor of said recorder until said printing bar is spaced from said needle, whereby the latter may indicate the instantaneous value of the current.

* * * * *